United States Patent
Velline et al.

(10) Patent No.: US 12,026,771 B1
(45) Date of Patent: *Jul. 2, 2024

(54) ATM CUSTOMER MESSAGING SYSTEMS

(71) Applicant: Wells Fargo Bank, N.A., San Francisco, CA (US)

(72) Inventors: Jonathan Velline, Oakland, CA (US); Darren Goetz, Salinas, CA (US); Xuan Nguyen, Daly City, CA (US); Nahal Agahi, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,784

(22) Filed: Feb. 20, 2023

Related U.S. Application Data

(63) Continuation of application No. 17/181,854, filed on Feb. 22, 2021, now Pat. No. 11,587,160, which is a
(Continued)

(51) Int. Cl.
*G06Q 40/02* (2023.01)
*G06Q 20/10* (2012.01)
(Continued)

(52) U.S. Cl.
CPC ......... *G06Q 40/02* (2013.01); *G06Q 20/1085* (2013.01); *G06Q 20/4014* (2013.01);
(Continued)

(58) Field of Classification Search
CPC .......... G06Q 20/1085; G06Q 20/4014; G06Q 30/0226; G06Q 40/02; G06Q 50/01; G07F 19/206; H04L 63/102
See application file for complete search history.

(56) References Cited

U.S. PATENT DOCUMENTS

| | | |
|---|---|---|
| 4,839,504 A | 6/1989 | Nakano |
| 5,010,238 A | 4/1991 | Kadono et al. |
| (Continued) | | |

FOREIGN PATENT DOCUMENTS

JP 2007-316960 A 12/2007

OTHER PUBLICATIONS

Morrison, D., Gift Cards via ATMs, Credit Union Times Magazine & CUTBreakingNews, Dec. 12, 2012, 2 pages.
(Continued)

*Primary Examiner* — Thien M Le
(74) *Attorney, Agent, or Firm* — Foley & Lardner LLP

(57) ABSTRACT

A system includes a computing system associated with a financial institution and communicatively coupled with one or more automated teller machines (ATMs), where the computing system is configured to authenticate an account holder via an ATM of the one or more ATMs based on identification information of the account holder, identify an event associated with the account holder, determine a message relating to the event to be displayed to the account holder based on the event, and display the message to the account holder via the ATM where the message being displayed is based on the account holder accessing the ATM within a threshold time period associated with the event.

20 Claims, 6 Drawing Sheets

Related U.S. Application Data continuation of application No. 16/672,149, filed on Nov. 1, 2019, now Pat. No. 10,929,922, which is a continuation of application No. 15/870,690, filed on Jan. 12, 2018, now Pat. No. 10,482,529, which is a continuation of application No. 15/075,833, filed on Mar. 21, 2016, now Pat. No. 9,984,411, which is a continuation of application No. 14/549,151, filed on Nov. 20, 2014, now Pat. No. 9,292,840, which is a continuation-in-part of application No. 14/076,071, filed on Nov. 8, 2013, now Pat. No. 9,230,413, which is a continuation of application No. 13/441,777, filed on Apr. 6, 2012, now Pat. No. 8,602,296.

(60) Provisional application No. 61/473,053, filed on Apr. 7, 2011.

(51) Int. Cl.
*G06Q 20/40* (2012.01)
*G06Q 30/0226* (2023.01)
*G06Q 50/00* (2012.01)
*G07F 19/00* (2006.01)
*H04L 9/40* (2022.01)

(52) U.S. Cl.
CPC ......... *G06Q 30/0226* (2013.01); *G06Q 50/01* (2013.01); *G07F 19/206* (2013.01); *H04L 63/102* (2013.01)

(56) References Cited

U.S. PATENT DOCUMENTS

| | | | |
|---|---|---|---|
| 5,326,734 A | 7/1994 | Vaughan | |
| 5,796,827 A | 8/1998 | Coppersmith et al. | |
| 5,880,444 A | 3/1999 | Shibata et al. | |
| 6,067,621 A | 5/2000 | Yu et al. | |
| 6,567,842 B2 | 5/2003 | De Leo et al. | |
| 7,100,199 B2 | 8/2006 | Ginter et al. | |
| 7,266,533 B2 | 9/2007 | Karas et al. | |
| 7,416,112 B2 | 8/2008 | Smith et al. | |
| 7,419,091 B1 | 9/2008 | Scanlon | |
| 7,801,775 B1 | 9/2010 | Roseman et al. | |
| 7,822,635 B1 | 10/2010 | Brown et al. | |
| 7,864,753 B1 | 1/2011 | Barzegar et al. | |
| 7,886,971 B2 | 2/2011 | Cassady et al. | |
| 8,020,754 B2 | 9/2011 | Schwarz, Jr. | |
| 8,073,712 B2 | 12/2011 | Jacobus et al. | |
| 8,156,042 B2 | 4/2012 | Winkelman, III et al. | |
| 8,220,943 B2 | 7/2012 | Koma et al. | |
| 8,255,318 B2 | 8/2012 | Royyuru | |
| 8,396,794 B1 | 3/2013 | Mo et al. | |
| 8,474,699 B2 | 7/2013 | Kolinski-Schultz et al. | |
| 8,554,671 B2 | 10/2013 | Ballout | |
| 8,561,891 B2 | 10/2013 | Dent et al. | |
| 8,602,296 B1 | 12/2013 | Velline et al. | |
| 8,630,402 B1 | 1/2014 | Martinez et al. | |
| 8,635,158 B1 | 1/2014 | Ledder et al. | |
| 8,655,762 B2 | 2/2014 | Abifaker | |
| 8,690,051 B1 | 4/2014 | Velline et al. | |
| 8,731,997 B2 | 5/2014 | Corbett et al. | |
| 8,767,151 B2 | 7/2014 | Chang et al. | |
| 8,797,297 B2 | 8/2014 | Yabuta et al. | |
| 8,821,262 B2 | 9/2014 | Smith et al. | |
| 9,230,413 B1 | 1/2016 | Velline et al. | |
| 9,268,390 B2 | 2/2016 | Gear et al. | |
| 9,286,637 B1 | 3/2016 | Keld et al. | |
| 9,292,840 B1 | 3/2016 | Velline et al. | |
| 9,589,256 B1 | 3/2017 | Thomas et al. | |
| 9,754,461 B1 | 9/2017 | Velline et al. | |
| 10,282,716 B1 | 5/2019 | Thomas et al. | |
| 10,522,007 B1 | 12/2019 | Velline et al. | |
| 10,592,878 B1 | 3/2020 | Thomas et al. | |
| 10,810,660 B1 | 10/2020 | Diggdon et al. | |
| 11,017,396 B2 | 5/2021 | Ishikawa et al. | |
| 11,341,504 B1 | 5/2022 | Stanev | |
| 2002/0073050 A1 | 6/2002 | Gusler et al. | |
| 2002/0133409 A1 | 9/2002 | Sawano et al. | |
| 2002/0138418 A1 | 9/2002 | Zarin et al. | |
| 2003/0004934 A1 | 1/2003 | Qian | |
| 2003/0040959 A1 | 2/2003 | Fei et al. | |
| 2003/0041244 A1 | 2/2003 | Buttyan et al. | |
| 2003/0061170 A1 | 3/2003 | Uzo | |
| 2003/0066876 A1 | 4/2003 | Goldman et al. | |
| 2003/0080852 A1 | 5/2003 | Harris | |
| 2003/0093293 A1 | 5/2003 | Han | |
| 2003/0097333 A1 | 5/2003 | Okamura | |
| 2003/0168510 A1 | 9/2003 | Allen | |
| 2004/0004116 A1 | 1/2004 | Hatanaka et al. | |
| 2004/0030894 A1 | 2/2004 | Labrou et al. | |
| 2004/0215566 A1 | 10/2004 | Meurer | |
| 2005/0027543 A1 | 2/2005 | Labrou et al. | |
| 2005/0080727 A1 | 4/2005 | Postrel | |
| 2005/0161502 A1 | 7/2005 | Smith et al. | |
| 2005/0216744 A1 | 9/2005 | Skygebjer | |
| 2005/0234769 A1 | 10/2005 | Jain et al. | |
| 2005/0269402 A1 | 12/2005 | Spitzer et al. | |
| 2005/0278222 A1 | 12/2005 | Nortrup | |
| 2006/0020542 A1 | 1/2006 | Litle et al. | |
| 2006/0038004 A1 | 2/2006 | Rielly et al. | |
| 2006/0107037 A1 | 5/2006 | Lincoln | |
| 2006/0157553 A1 | 7/2006 | Kelley et al. | |
| 2006/0168657 A1 | 7/2006 | Baentsch et al. | |
| 2006/0178856 A1 | 8/2006 | Roberts et al. | |
| 2006/0178932 A1 | 8/2006 | Lang | |
| 2006/0179304 A1 | 8/2006 | Han | |
| 2006/0249568 A1 | 11/2006 | Scanlon | |
| 2006/0287965 A1 | 12/2006 | Bajan | |
| 2006/0289630 A1 | 12/2006 | Updike et al. | |
| 2006/0294023 A1 | 12/2006 | Lu | |
| 2007/0030824 A1 | 2/2007 | Ribaudo et al. | |
| 2007/0037554 A1 | 2/2007 | Freeny | |
| 2007/0162554 A1 | 7/2007 | Branda et al. | |
| 2007/0255653 A1 | 11/2007 | Tumminaro et al. | |
| 2007/0265948 A1 | 11/2007 | Maiorino et al. | |
| 2008/0052686 A1 | 2/2008 | Jogand-Coulomb et al. | |
| 2008/0074496 A1 | 3/2008 | Venetianer et al. | |
| 2008/0076534 A1 | 3/2008 | Iddings et al. | |
| 2008/0086693 A1 | 4/2008 | Jogand-Coulomb et al. | |
| 2008/0320139 A1* | 12/2008 | Fukuda | H04L 51/214 709/226 |
| 2009/0037995 A1 | 2/2009 | Zapata et al. | |
| 2009/0063345 A1 | 3/2009 | Erikson | |
| 2009/0064284 A1 | 3/2009 | Poston et al. | |
| 2009/0076934 A1 | 3/2009 | Shahbazi et al. | |
| 2009/0102989 A1 | 4/2009 | Sakai et al. | |
| 2009/0106158 A1 | 4/2009 | Hill | |
| 2009/0108015 A1 | 4/2009 | Kreamer | |
| 2009/0124384 A1 | 5/2009 | Smith et al. | |
| 2009/0132819 A1 | 5/2009 | Lu et al. | |
| 2009/0156190 A1 | 6/2009 | Fisher | |
| 2009/0186690 A1 | 7/2009 | Toth et al. | |
| 2009/0276284 A1* | 11/2009 | Yost | G06Q 50/01 705/26.7 |
| 2009/0320106 A1 | 12/2009 | Jones et al. | |
| 2010/0030687 A1 | 2/2010 | Panthaki et al. | |
| 2010/0113950 A1 | 5/2010 | Lin et al. | |
| 2010/0145854 A1 | 6/2010 | Messerges et al. | |
| 2010/0228580 A1 | 9/2010 | Zoldi et al. | |
| 2010/0235283 A1 | 9/2010 | Gerson | |
| 2010/0332388 A1 | 12/2010 | Rielly et al. | |
| 2011/0106597 A1* | 5/2011 | Ferdman | G06Q 30/0241 235/375 |
| 2011/0137689 A1 | 6/2011 | Chua et al. | |
| 2011/0140841 A1 | 6/2011 | Bona et al. | |
| 2011/0159850 A1 | 6/2011 | Faith et al. | |
| 2011/0162078 A1 | 6/2011 | Taveau et al. | |
| 2012/0012652 A1 | 1/2012 | Couper et al. | |
| 2012/0016794 A1 | 1/2012 | Orr et al. | |
| 2012/0018007 A1 | 1/2012 | Villermaux et al. | |
| 2012/0023019 A1 | 1/2012 | Hartfield et al. | |
| 2012/0035906 A1 | 2/2012 | Jephcott | |
| 2012/0066127 A1 | 3/2012 | Kingston et al. | |

(56) References Cited

U.S. PATENT DOCUMENTS

| | | | |
|---|---|---|---|
| 2012/0101881 A1* | 4/2012 | Taylor | G06Q 30/04 705/14.36 |
| 2012/0150611 A1 | 6/2012 | Isaacson et al. | |
| 2012/0159294 A1* | 6/2012 | Gonsalves | G06F 16/954 715/205 |
| 2012/0179602 A1 | 7/2012 | Wheelock | |
| 2012/0185322 A1 | 7/2012 | Shipley | |
| 2012/0185388 A1 | 7/2012 | Pranger | |
| 2012/0245987 A1 | 9/2012 | Isaacson et al. | |
| 2012/0278234 A1 | 11/2012 | Dent et al. | |
| 2012/0292388 A1 | 11/2012 | Hernandez | |
| 2013/0013268 A1 | 1/2013 | Woolf et al. | |
| 2013/0024239 A1 | 1/2013 | Baker et al. | |
| 2013/0046810 A1 | 2/2013 | Loew | |
| 2013/0073388 A1 | 3/2013 | Heath | |
| 2013/0151617 A1* | 6/2013 | Davis | H04L 63/08 709/204 |
| 2013/0173389 A1 | 7/2013 | Page et al. | |
| 2013/0211890 A1* | 8/2013 | Heitmueller | G06Q 30/0253 705/14.24 |
| 2013/0310163 A1 | 11/2013 | Smith et al. | |
| 2013/0325671 A1 | 12/2013 | Glass et al. | |
| 2014/0006129 A1 | 1/2014 | Heath | |
| 2014/0032372 A1 | 1/2014 | King et al. | |
| 2014/0074632 A1 | 3/2014 | Mateen et al. | |
| 2014/0089188 A1 | 3/2014 | Rao | |
| 2014/0129440 A1 | 5/2014 | Smith et al. | |
| 2014/0149195 A1* | 5/2014 | Abbott | G06Q 30/0215 705/14.51 |
| 2014/0164762 A1 | 6/2014 | Lee et al. | |
| 2014/0207612 A1 | 7/2014 | Isaacson et al. | |
| 2014/0229270 A1* | 8/2014 | Rashwan | G06Q 30/0277 705/14.43 |
| 2014/0229387 A1 | 8/2014 | Chow | |
| 2014/0245392 A1 | 8/2014 | Masters et al. | |
| 2014/0279527 A1 | 9/2014 | Duke et al. | |
| 2014/0280634 A1* | 9/2014 | Mansfield | G06Q 10/02 709/206 |
| 2014/0316917 A1 | 10/2014 | Westby et al. | |
| 2015/0006426 A1 | 1/2015 | Sobhani et al. | |
| 2015/0025950 A1 | 1/2015 | Yu | |
| 2015/0066748 A1 | 3/2015 | Winslow et al. | |
| 2015/0088650 A1 | 3/2015 | Taylor et al. | |
| 2015/0127478 A1 | 5/2015 | Westby et al. | |
| 2015/0136850 A1 | 5/2015 | Akahane | |
| 2015/0186857 A1 | 7/2015 | Swinfen | |
| 2015/0356639 A1 | 12/2015 | Sobhani | |
| 2016/0012411 A1 | 1/2016 | Kursun et al. | |
| 2016/0012431 A1 | 1/2016 | Proctor et al. | |
| 2016/0035026 A1 | 2/2016 | Chen | |
| 2016/0042334 A1 | 2/2016 | Westby et al. | |
| 2016/0078527 A1 | 3/2016 | Dupuis et al. | |
| 2016/0098709 A1 | 4/2016 | Johnson et al. | |
| 2016/0358162 A1 | 12/2016 | Park et al. | |

OTHER PUBLICATIONS

Talbot, M., Commentary: Banking and social media: Where is it going?, ATM Marketplace, Aug. 30, 2012, retrieved from the Internet at http://www.atmmarketplace.com/articles/commentary-banking-and-social-media-where-is-it-going-2/ on Dec. 12, 2016, 2 pages as printed.
Whatcom Educational Credit Union, "WECU Visa News: Tips for Shopping, Card Safety, and Fraud Protection" brochure, Nov. 2006, 1 page.
U.S. Appl. No. 13/441,777, filed Apr. 6, 2012.
U.S. Appl. No. 14/076,071, filed Nov. 8, 2013.
U.S. Appl. No. 14/549,151, filed Nov. 20, 2014.
U.S. Appl. No. 15/075,833, filed Mar. 21, 2016.
U.S. Appl. No. 15/870,690, filed Jan. 12, 2018.
U.S. Appl. No. 16/672,149, filed Nov. 1, 2019.
U.S. Appl. No. 17/181,854, filed Feb. 22, 2021.

* cited by examiner

ATM CUSTOMER MESSAGING SYSTEMS

CROSS-REFERENCE TO RELATED APPLICATIONS

This application is a continuation of U.S. patent application Ser. No. 17/181,854, filed Feb. 22, 2021, which is a continuation of U.S. patent application Ser. No. 16/672,149, filed Nov. 1, 2019, now U.S. Pat. No. 10,929,922, which is a continuation of U.S. patent application Ser. No. 15/870,690, filed Jan. 12, 2018, now U.S. Pat. No. 10,482,529, which is a continuation of U.S. patent application Ser. No. 15/075,833, filed Mar. 21, 2016, now U.S. Pat. No. 9,984,411, which is a continuation of U.S. patent application Ser. No. 14/549,151, filed Nov. 20, 2014, now U.S. Pat. No. 9,292,840, which is a continuation-in-part of U.S. patent application Ser. No. 14/076,071, filed Nov. 8, 2013, now U.S. Pat. No. 9,230,413, which is a continuation of U.S. patent application Ser. No. 13/441,777, filed Apr. 6, 2012, now U.S. Pat. No. 8,602,296, which claims the benefit of U.S. Provisional Application No. 61/473,053, filed Apr. 7, 2011, the entire contents of each of which is hereby incorporated by reference.

BACKGROUND

Financial institutions provide various ways for customers to access account information and perform transactions, such as transaction machines, websites, and brick and mortar locations (e.g., retail bank branches). Transaction machines, such as automated teller machines (ATMs), may be accessed at various geographic locations, such as bank locations, convenience stores or other stores to facilitate the account holder's interaction with banking systems. Transaction machines accept transaction cards such as debit, credit, or stored value cards that are often used by account holders to purchase items or services or to obtain funds.

SUMMARY

One embodiment relates to a method including receiving identification information for a first account holder at a financial institution, authenticating the first account holder via an automated teller machine (ATM) based on the identification information, identifying an event, associated with the first account holder including determining date information for the event, configuring a message relating to the event to be displayed to the first account holder based on the event, storing trigger configuration information comprising a time window including the date information for the event, and displaying the message to the first account holder via the ATM, the message being displayed when the first account holder accesses the ATM at a time occurring within the time window.

Another embodiment relates to a method including receiving identification information for a first account holder at a financial institution, authenticating the first account holder via an automated teller machine (ATM) based on the identification information, identifying an event associated with the first account holder, including determining date information for the event, storing trigger configuration information comprising a time window including the date information for the event, and delivering a gift to the first account holder via the ATM, the gift being provided to the first account holder when the first account holder accesses the ATM at a time occurring within the time window.

Another embodiment relates to a non-transitory computer-readable storage medium having instructions encoded thereon that, when executed by one or more processors, cause the one or more processors to perform a method. The method including receiving identification information for a first account holder at a financial institution, authenticating the first account holder via an automated teller machine (ATM) based on the identification information, identifying an event associated with the first account holder, including determining date information for the event, storing trigger configuration information comprising a time window including the date information for the event, and at least one of: configuring a message relating to the event to be displayed to the first account holder based on the upcoming event, and displaying the message to the first account holder via the ATM, the message being displayed when the first account holder accesses the ATM within the time window, or delivering a gift to the first account holder via the ATM, the gift being provided to the first account holder when the first account holder accesses the ATM within the time window.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION OF EXAMPLE EMBODIMENTS

The systems and methods described provide a mechanism for using automated teller machines (ATMs) or other channels to remind a user of the date of a particular event, offer to generate a message, generate a message based upon that particular event, and forward the message associated with the particular event to a recipient through the ATM. In some embodiments, the particular event may be an event that is personal to another account holder, such as the birthday of another account holder. In such case, an ATM may alert the user about the other account holder's upcoming birthday and invite the user to send a message to the other account holder through the ATM. The other account holder may receive the message concurrently with the event, e.g., during the month of his or her birthday, for example.

Figure 1:
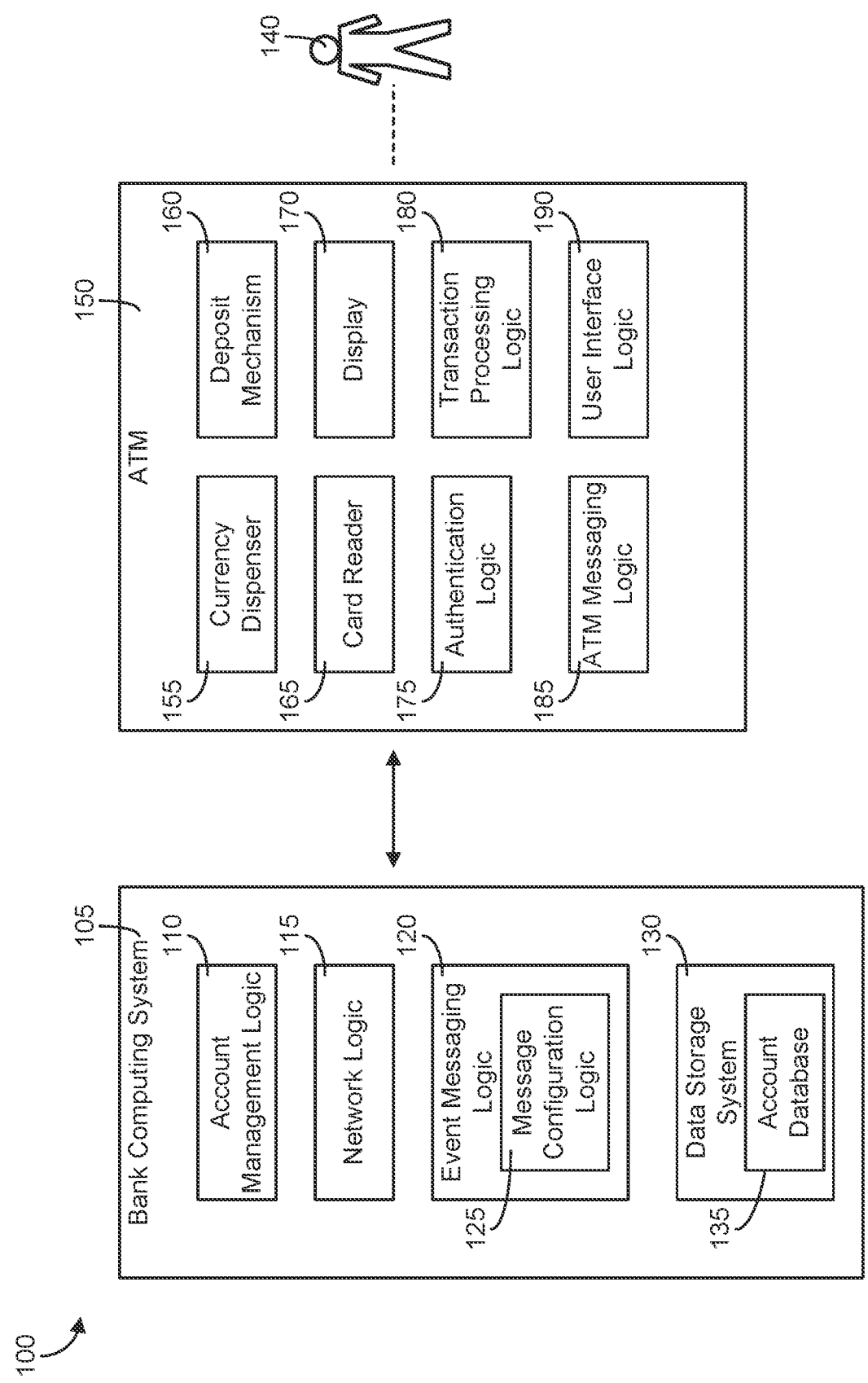
FIG. 1 is a schematic diagram of a system that includes an ATM configured to communicate with a bank computing system, according to an example embodiment.

Referring to FIG. 1 a schematic diagram of a system 100 that includes an ATM 150 and a bank computing system 105 is shown. A user 140 may interact with the bank computing system 105 through the ATM 150. The ATM 150 may comprise an ATM computing system that facilitates the operation of the ATM 150 described throughout the disclosure. It is understood that all functions and capabilities described regarding the ATM 150 may be facilitated and/or implemented by one or more ATM computing systems connected with the ATM 150. The ATM 150 may be operated by a financial institution, which may also operate the bank computing system 105. The system 100 may include a plurality of ATMs 150 and ATM computing systems as well as a plurality of financial institutions and bank computing systems 105. According to some embodiments, the system 100 may be accessed by an account holder who seeks to perform a financial transaction, obtain account information, access other products/services, and so on.

In an example embodiment, the bank computing system 105 may be provided or controlled by a bank or other financial institution. The users 140 of the ATM 150 may be account holders at the financial institution operating the ATM 150. The users may access the bank computing system 105 through tellers at retail bank branches, through the financial institution's website, or through the ATM 150/ATM computing system. In FIG. 1, for example, the user 140 is shown accessing the bank computing system 105 through the ATM 150. In practice, the bank computing system 105 may include one or more server computing systems, for example, comprising one or more networked computer servers having a processor and non-transitory machine readable media. The functions, logic, and capabilities described herein may therefore be implemented as program logic stored on the machine-readable media and executable by the processor to perform the operations described herein.

The bank computing system 105 may include, among other systems, account management logic 110, network logic 115, event messaging logic 120, a data storage system 130, and an account database 135. In some embodiments, the account management logic 110 may perform various tasks in connection with accounts held by account holders at the financial institution, such as account processing (processing of account debits and credits), authentication, statement generation, account status, funds transfers, and so on. Account management logic 110 may also maintain a log of all transactions that occurred in the past and store data related to the account in a data storage system 130.

Network logic 115 may be used to allow the bank computing system 105 to connect and communicate with other systems such as the ATM 150. One embodiment of the network logic 115 may be configured to communicate with the ATM 150 over a proprietary encrypted network. Another embodiment of the network logic 115 may be configured to communicate with the ATM 150 over a public encrypted network. The network logic 115 may also connect to the Internet to permit account holders access to the bank computing system 105 through an on-line banking area of a website of the bank, through a bank-operated application downloaded on a mobile device, etc. Communication connections facilitated by the network logic 115 may include wireless connections as well as wired connections. Network logic 115 may also comprise other logic that is configured to provide a connection to other types of devices such as mobile devices (including cell phones, smart phones, mobile tablets), fax machines, server-based computing systems, and so on.

The event messaging logic 120 including message configuration logic 125 may be configured to facilitate the generation and/or the delivery of messages created by a user 140 through the ATM 150. The event messaging logic 120 may communicate with the ATM 150 and/or ATM computing systems operating the ATM 150 to facilitate the flow of messages. In some embodiments, event messaging logic 120 logic may also communicate with one or more of the data storage system 130, the account database 135, and the account management logic 110. In some embodiments, the event messaging logic 120 receives a message from the ATM 150, delivers the message to the recipient, and facilitates the viewing of the message by the recipient.

The event messaging logic 120 may identify other account holders that are known by the user. For example, the event messaging logic 120 may identify a joint account holder (e.g., a spouse of the user) as being somebody that is known by the user. In addition to joint account holders, in some embodiments, information about other account holders known by the user may also be obtained from the user, from social media websites, or in another manner. The event messaging logic 120 may gather information about the other account holders using a variety of mechanisms. For example, the event messaging logic 120 may transfer information from the data storage system 130.

According to an embodiment, the event messaging logic 120 may also receive information entered into the bank computing system 105 at the time the financial account was opened for the account holder or the other account holders. Such information can include the birthdate of the account holders, for example. In another embodiment, the event messaging logic 120 can be configured to prompt for information regarding a personal event associated with one or more account holders. The data entered may include the name of the personal event (e.g., birthday, wedding anniversary, etc.), date information (e.g., Jan. 3, 2014), personal reminders associated with the personal event (e.g., order cake and balloons), count-down information for the upcoming date, etc. In yet another embodiment, members within a community (e.g., an online community) in which the user 140 belongs may provide information to the event messaging logic 120 in a secure mechanism separate from any account related logic (i.e., account management logic 110 or account database 135). In other embodiments, the user 140 may enter the data through a variety of platforms, including through a financial institution mobile application, a financial institution based website, an ATM 150, provide the information to a teller working at a branch, etc.

In addition to receiving data into the bank computing system 105, the event messaging logic 120 may also be configured to provide data (e.g., date information, name information, personal event name and detail information, date count-down information, etc.) to the ATM 150. For example, the event messaging logic 120 may communicate with the ATM messaging logic 185 to transfer data from the bank computing system 105. The ATM 150 may retrieve the date information from the bank computing system 105 through the event messaging logic 120 and generate a message from one account holder to another account holder regarding the personal event through the ATM. The generation of the message is discussed in further detail below. In some embodiments, the event messaging logic 120 may cooperate to perform one or more tasks, such as generating a message. In some embodiments, as discussed throughout, the message may have a gift attached thereto. In such an event, the event messaging logic 120 may be configured to allow a recipient to reject, accept, and/or redeem the gift attached to the message. Additional information regarding the receipt of the message is discussed in greater detail further below.

The data storage system 130 may include an account database 135. The account database 135 can be structured according to various database types, such as, relational, hierarchical, network, flat or object relational. The account database 135 may be configured to store account information such as balances and a log of each transaction processed by the account management logic 110. The account database 135 may be configured to store other activity profile information such as account preferences the user has specified, background pictures the user has uploaded, messages communicated using the system 100, and so on.

In other embodiments, the bank computing system 105 may comprise user interface logic (not shown) configured to generate customized menus and menu options for a user at an ATM 150. The bank computing system 105 and the ATM 150 may cooperate to provide a customized user interface at the ATM 150. In one example, the user interface logic may comprise program logic located at the bank computing system 105, at the ATM 150, or at both the bank computing system 105 and the ATM 150. Thus, the operations described herein as being performed by the user interface logic may be performed either at the bank computing system 105, at the ATM 150, or at both the bank computing system 105 and the ATM 150. The user interface logic may communicate with the event messaging logic 120, the ATM messaging logic 185, and user interface logic 190 (with the ATM 150) to display information to the user 140 and/or a recipient of the message on the recipient's receiving device (e.g., smartphone, tablet, ATM). The user interface logic may generate a graphical user interface for presentation to a user 140 at the ATM 150 via a display 170, wherein the user holds a financial account with the financial institution operating the ATM 150. The user interface logic may receive information and adjust the menu options on the display 170 according to data provided by the user interface logic 190. Other configurations are also possible, some of which are described below.

According to one embodiment, the ATM 150 may include a currency dispenser 155, deposit mechanism 160, card reader 165, display 170, authentication logic 175, transaction processing logic 180, ATM messaging logic 185, and user interface logic 190. Other hardware may also be included, such as a keypad or buttons for receiving user inputs.

The currency dispenser 155 may be configured to dispense currency notes ("cash") to a user 140 of the ATM 150 from the user's financial institution accounts. The currency dispenser 155 may be configured to dispense currency in various denominations, as specified by the user 140. For example, the currency dispenser 155 may dispense cash in multiples of fives, tens, or twenties. The deposit mechanism 160 may be configured to accept deposits of items such as cash and/or checks into the ATM 150. In some embodiments, the deposit mechanism 160 may be configured to accept deposits without an envelope. In other embodiments, the deposit mechanism 160 can accept deposits placed inside an envelope.

The card reader 165 may be configured to obtain information from a transaction card. The transaction card may include a variety of cards such as a credit card, debit card, ATM card, stored value card, etc. In one embodiment, the card reader 165 obtains information from a transaction card by reading the magnetic stripe ("magstripe") of the transaction card. While performing the read operation, the card reader 165 may be configured to read the account information and the PIN associated with the card and the account.

The display 170 may be configured to display graphics such as messages, menus, instructions, background photos (e.g., advertisements, etc.), logos, and so on. In one embodiment, the display 170 is a touch screen display that is capable of detecting user touches to receive user input. The display 170 allows the user 140 to interact with the ATM 150 in order to process transactions. The transactions may include withdrawing funds, purchasing one or more goods or services, transferring funds from one account to another account, paying a bill or mortgage and so on. The display 170 may be used to display various customized menu options transactions to the user 140.

The authentication logic 175 may communicate with the card reader 165 and the bank computing system 105 to gather information about the user 140 of the ATM 150. According to some embodiments, the authentication logic 175 authenticates a user 140 as being a valid account holder associated with the transaction card and the corresponding account at the bank or financial institution. The authentication logic 175 may employ a variety of methods to authenticate the user 140, including cross-checking stored data with received data, biometrics, password information, pin code, etc.

According to one example embodiment, the transaction processing logic 180 may facilitate the processing of financial service transactions of a user 140 at the ATM 150. The ATM 150 may engage a variety transactions, including depositing, withdrawing, currency exchanges, balance transfers, account balance inquiries, purchases, etc. In some embodiments, the transaction processing logic 124 may cooperate with the bank computing system 105 to ensure that transactions are accurately debited/credited to the account held by the user 140. The transaction processing logic 180 may also communicate with other computing servers connected to and/or within the ATM computing system to process transactions.

In some embodiments, the ATM messaging logic 185 may comprise instructions stored in non-transitory computer readable media and executable by a processor to perform for a variety of functions disclosed herein. For example, the ATM messaging logic 185 may prompt the user 140 to send a message to a recipient through the ATM 150. In some embodiments, the recipient may comprise a joint account holder who shares a financial account with the user 140. In another embodiment, the recipient may comprise a user of an online community to which the user 140/account holder belongs. The ATM messaging logic 185 may also communicate with the bank computing system 105 (e.g., the data storage system 130) to retrieve facts regarding a particular date or event. The ATM messaging logic 185 may also be configured to communicate with other parts of the system (e.g., the card reader 165, authentication logic 175, user interface logic 190) to implement and execute the functions described throughout. For example, the ATM messaging logic 185 may communicate with the card reader 165, the account management logic 110, and the data storage system 130 to ascertain the data for generating and delivering messages through the ATM 150. Further details describing functions of the ATM messaging logic 185 are discussed below.

In some embodiments, the ATM 150 may also include user interface logic 190. The user interface logic 190 generates a graphical user interface for presentation to the user 140 at the ATM 150 via the display 170. The user interface logic 190 may be configured to generate a graphical interface with customized menu options displayable to each user 140. For example, a menu option may be provided to the user to select a new background image. For example, the user 140 may be permitted to select from a variety of standard background images available at the ATM 150. As another example, the user 140 may be permitted to upload a new background image through an on-line banking website provided by the bank computing system 105. In one embodiment, the background picture 560 may be a message that the user 140 or another individual such as a relative has uploaded (e.g., "Happy birthday, Mom!)". The menu may be assigned a score that is determined based on the amount of time (or the number of visits to a transaction machine) it has been since the user 140 last viewed a menu option to select a custom image.

The user interface logic 190 may also generate a graphical interface for displaying and creating content for event messages at the ATM 150. The content may include text, graphics, vocals, video, memes, etc. For example, the user 140 may be permitted to enter a personalized message, select from an option of standard messages, select a particular background color scheme or theme, or upload a personal photo for display to a recipient. In other embodiments, the user 140 may also be permitted to upload a meme, attach a short video or gif, sketch a drawing, etc. The user interface logic 190 may provide a variety of systems, hardware, and/or software to allow a user 140 to capture the content for use with the event messaging logic 120. For example, interfaces such as keypads, touch pads or screens, video camera, photo camera, microphones, and related software may be employed by the user interface logic 190 to allow the ATM 150 to capture content entered by the user 140.

Figure 2:
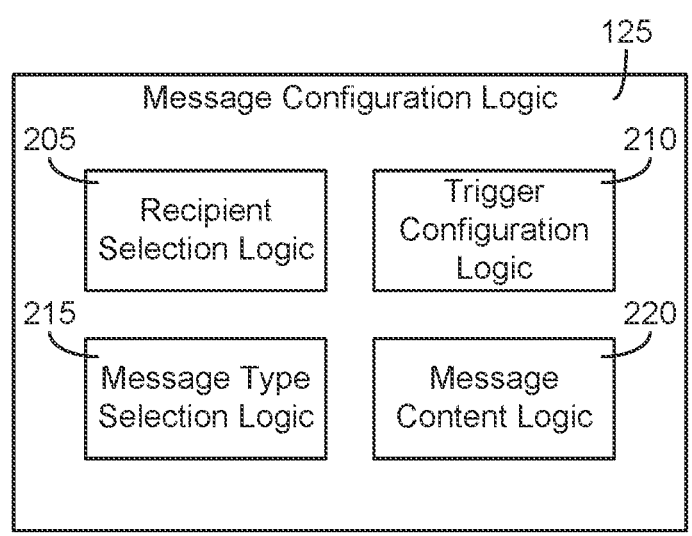
FIG. 2 is a schematic diagram of message configuration logic of FIG. 1.

Referring to FIG. 2, the message configuration logic 125 is shown in greater detail. The message configuration logic 125 includes recipient selection logic 205, trigger configuration logic 210, message type selection logic 215, and message content logic 220. The message configuration logic 125 may be accessed by the user at an ATM, via on-line banking, via mobile banking, or in another manner.

The recipient selection logic 205 is configured select a message recipient based on user inputs. In one embodiment, the potential recipients to whom the user may send message may be limited to joint account holders. In such an arrangement, the recipient selection logic 205 may identify whether there are any joint account holders associated with the user and, if so, select the joint account holder as a potential message recipient. In other embodiments, the user may also be permitted to send message to other recipients (i.e., people that are not joint account holders). For example, account holders may opt-in or opt-out of receiving messages from other account holders. For account holders that opt in to such an arrangement, such account holders may also agree to having limited personal information about themselves (e.g., name and city of residence) displayed to other account holders to facilitate establishing connections between account holders (i.e., account holders that know each other). Further steps (e.g., transmission and approval of friend requests) may also be taken to facilitate the establishment of valid connections.

In another embodiment, the recipient selection logic 205 may be configured to integrate the system 100 with social media websites (e.g., Facebook, Twitter, Instagram, etc.). For example, the system may provide the option for a user to provide login credentials (login ID and password) for a social media website. Using the login credentials, the recipient selection logic 205 may then access the user's account on the social media website and obtain a list of the user's friends/connections on the social media website. This list may then be compared against the social media website login credentials of other account holders for whom such login credentials have already been obtained to identify potential connections. Again, steps (e.g., transmission and approval of further friend requests within the context of the system 100) may also be taken to facilitate the establishment of valid connections (to accommodate situations where an individual has been "friended" on the social media website, but the user does not wish to establish a connection in the context of the system 100). As another example, where a social media website has various "levels" of friends, the user may designate the friend levels on the social media website from whom the user is willing to accept messages in the system 100.

The trigger configuration logic 210 is configured to configure a message trigger based on user inputs. The message trigger determines, at least in part, when the message is displayed to the recipient. (The timing is also dependent on when the recipient accesses a banking channel. Hence, for messages displayed via an ATM, for example, another factor would include the timing of the user's visit to the ATM.) Various types of message triggers may be used. For example, the message trigger may be date-based, and the message may be displayed concurrently with when a particular event occurs. For example, if the message to be sent is date-driven (e.g., a happy birthday message, a happy anniversary message, etc.), the user may indicate the date on which the event occurs. For example, for a happy birthday message, the recipient's birthday is Jan. 1, 1981, the message may be displayed when both (1) the current date is within two week window following January 1, and (2) the recipient is currently making a visit to an ATM. Whether the event is deemed "concurrent" may be determined by default or based on user inputs. For example, the window may be selected by default by the trigger configuration logic 210, e.g., to be a two-week window. In other embodiments, the window may be selectable in response to inputs received from the user when the message is configured. For example, based on the user inputs, a one month window may be selected.

The message trigger may be based on other parameters besides date. For example, the message trigger may be based on account balances. For example, if the recipient maintains a savings goal in online banking, then the user may be provided with a message that states: "Recipient is working towards reaching a savings goal. Would you like to send Recipient a congratulatory message when that goal is reached?" Assuming the user answers affirmatively, then when the recipient meets the savings goal, a message may be sent to the recipient from the user that states: "Congratulations on meeting your savings goal!"

As another example, the message trigger may be based on transaction activity, such as the location of one or more transactions performed by the recipient. For example, the bank computing system 105 may determine whether the recipient is traveling (e.g., based on usage of a credit card at a restaurant in a different state than the state in which the recipient lives). In such a case, the user may configure a message that is configured to be sent to the recipient when it is detected that the recipient is traveling (e.g., "Safe travels!").

The message trigger may also be based on a setting that dictates that a message be sent each time the recipient uses an ATM. For example, the user may generate a plurality of messages (e.g., 5, 10, 20, 50 or more). For example, spouse A may generate a series of messages to be delivered to spouse B. The system may cycle through the messages each time spouse B uses an ATM, such that spouse B is provided with an uplifting message from spouse A (e.g., "Have a great day, honey!) whenever spouse B uses an ATM.

The message type selection logic 215 is configured to select a message type based on user inputs. For example, the message may strictly be a message with no further added content. As another example, the message may be a message in combination with a gift. In such an example, the message type selection logic 215 may be configured to select a gift based on user inputs. For example, the gift may be a gift of cash. For example, user inputs may be received from the user that indicate a date range, provide the happy birthday message, and provide a designation of a dollar amount to be given as a gift (e.g. $40). Then, the next time the recipient uses an ATM, the recipient the user may be provided with the happy birthday message, and an extra $40 in cash may be dispensed to the recipient to complete the gift process.

As another example, the user may have accumulated rewards points at a number of merchants. The message type selection logic 215 may be configured to receive user inputs that designate gift options from which the recipient may select. For example, the recipient may be provided with the option to select $40 worth of rewards points from merchant A, $40 worth of rewards points from merchant B, or $40 worth of rewards points from merchant C. The recipient may then select one of the options, e.g., and be provided with a gift card from that merchant.

The message content logic 220 is configured to determine message content based on user inputs. In one embodiment, the user selects from a predetermined set of message templates. For example, the system may provide a series of common/standardized messages from which the user may select (e.g., "Happy Birthday," "Happy Anniversary," so on). In other embodiments, the text of the message is received from the recipient.

In some embodiments, the message content logic 220 may also be configured to filter message content, i.e., in situations where the user is permitted to generate the text of the message. For example, the message content logic 220 may detect situations where the message content is deemed inappropriate. In one embodiment, the message content logic 220 may provide a default appropriateness threshold that implements a minimal level of filtering. This may be a user-selectable setting, such that any given user can also select a higher level of filtering if desired.

In some embodiments, the message configuration logic 125 is configured to scan calendar tools for dates (e.g., Google Calendar, Microsoft Outlook, and so on). For example, the user may be prompted to provide login credentials for an online calendar program, prompted to identify a locally executing calendar program, etc. The message configuration logic 125 may then scan for events that are scheduled to recur on a yearly basis, on the assumption that a such a recurring event may be a birthday, anniversary, or the like. As another example, the message configuration logic 125 may be configured to scan for keywords in the calendar entries that are likely to be associated with a personal event. For example, the message configuration logic 125 may be configured to scan for a proper noun (i.e., a person's name) coupled with a keyword such as "birthday" or "b-day." The message configuration logic 125 may also be configured to store information about the message for future use. For example, in the context of a wedding anniversary, the message configuration logic may be configured to store information about the message, such that in subsequent years, the user may be prompted whether the user wishes to send the message again in the current year.

Figure 3:
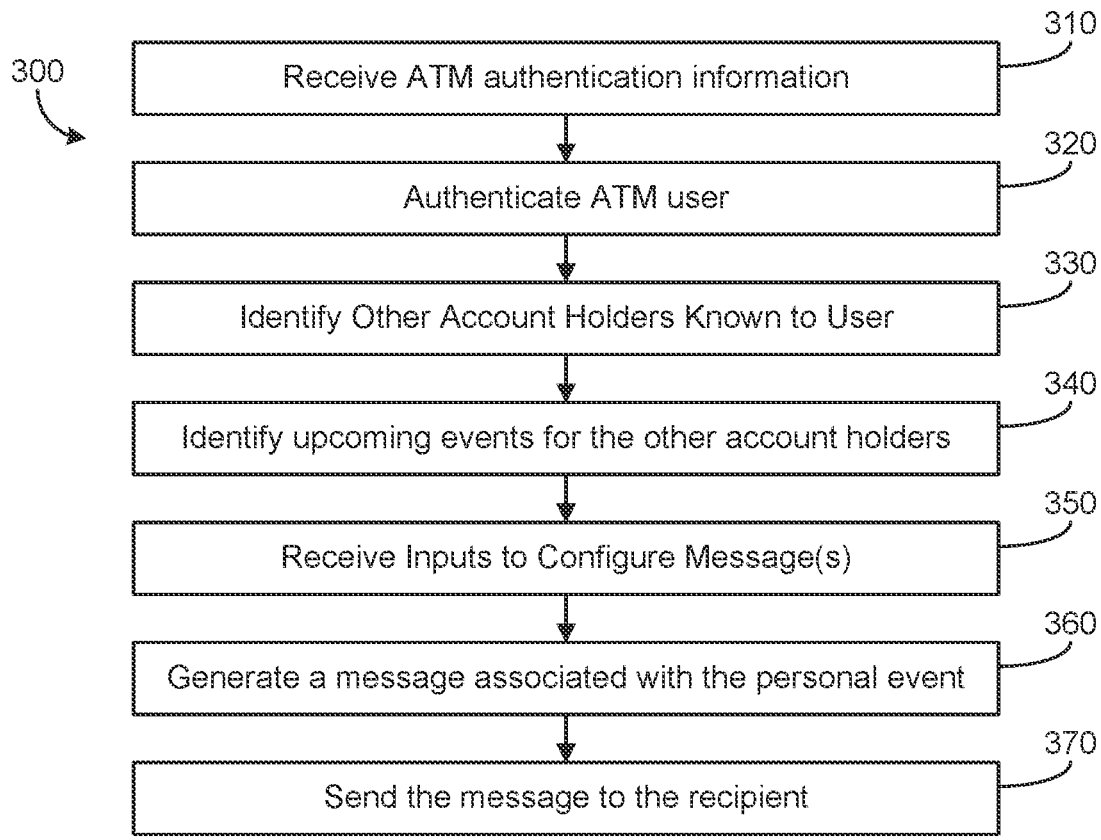
FIG. 3 is a flow diagram of a process for generating a message through the ATM, according to an example embodiment.

Referring to FIG. 3, a flow diagram of a process 300 for generating a message through the ATM 150 according to an example embodiment is shown. For purposes of providing an example, it is assumed in the discussion of FIG. 3 that the user is using at an ATM. As will be appreciated, however, the user may also access the features described herein via another channel, such as through a financial institution website, an application on a mobile device, through in-store banking, etc.

The process 300 may be implemented by one or more portions of the system 100 shown FIG. 1, including the bank computing system 105 (e.g., the account management logic 110, the event messaging logic 120, the data storage system 130, and the account database 135) and the ATM 150 (e.g., the card reader 165, the display 170, the authentication logic 175, the transaction processing logic 180, the ATM messaging logic 185, and the user interface logic 190). The process 300 may involve receiving ATM 150 authentication information (310). Authentication information may comprise any information that authenticates the user 140 of the ATM 150 as the account holder at the financial institution operating the ATM 150. For example, authentication information may comprise a pin number entered by the user 140 at the ATM 150 upon providing a transaction card to the card reader 165. Authentication information may also comprise data read from the transaction card, such as track 1 data and track 2 data.

The process 300 may further involve authenticating the user 140 of the ATM 150 (320). The authentication information received at step 210 may be used to authenticate the user 140. In some embodiments, the user 140 may be authenticated when the user 140 is physically present at the ATM 150. In other embodiments, the user 140 may be authenticated when the user 140 is within a proximity of the ATM 150 by way of a connected mobile device (e.g., a smartphone, a tablet, etc.). In one embodiment, the ATM 150 may use information from a transaction card as retrieved by the card reader 165 to authenticate a user 140. In other embodiments, the ATM 150 may use biometric information to authenticate the user 140 of the ATM 150. It is understood that a variety of tools and methods may be used to authenticate a user 140 of the ATM 150.

After the user authenticates at the ATM 150, the user may be provided with a variety of menu options (e.g., withdraw cash, make a deposit, purchase stamps, and so on). One of the menu options may be an option to configure personal messages to other account holders. The user may provide input(s) at the ATM (e.g., depress a button indicating personal messaging) to obtain access to the personal messaging features. In other embodiments, e.g., where the user can only send messages to a joint account holder, the user may simply be prompted to configure a message to be sent to the joint account holder if the user has not already done so.

The process 300 may identify other account holders known to the user (330). For example, the ATM 150 may communicate with the bank computing system 105 to identify any joint account holders that may exist. As another example, the user may be prompted to provide name/address information, social media login credentials, and/or other information that may be used to establish connections and thereby identify other people known by the user, as discussed above.

The process 300 may comprise identifying an upcoming personal event for any identified account holders (340). In some embodiments, the ATM messaging logic 185 may be configured to communicate with different logic modules or systems to obtain identifying information for a personal event associated with one or more account holders. In some embodiments, the ATM messaging logic 185 may communicate with the event messaging logic 120 and/or the data storage system 130 to determine the data associated with the upcoming personal event (e.g., date information, name of event, count down until the date, etc.). In other embodiments, the ATM 150 may be structured to generate an invitation to the user 140, prompting the user 140 to send a message based upon the data relating to the personal event received from the event messaging logic 120 and/or data storage system 130.

The process 300 may comprise receiving inputs to configure messages (350) and, based on the inputs, generating the messages associated with the personal event (360). The ATM messaging logic 185 may be configured to generate the message for the user 140 to transfer to a recipient (e.g., a joint account holder, another account holder, etc.). As previously indicated, according to some embodiments, the event message may be associated with a cyclical event. For example, the event message may be related to a birthdate, an adoption date, an anniversary, etc. According to other embodiments, the event messages may be associated with a particular one-time celebratory event, such as a graduation day, house warming, new job, stellar report card, etc. In one example, customer names are dynamically populated on the ATM 150 display 170. Using the ATM 150, customers are able to wish each other a happy birthday through the ATM 150.

In one example embodiment, Customer A and Customer B share a joint checking account at a financial institution. Customer A's birthday is in March. In February, Customer B visits the ATM 150 and is asked through the ATM 150 computing system if Customer B would like to send Customer A, the joint account holder, a happy birthday message in March. If Customer B opts in and chooses to send the birthday wishes through the happy birthday message, then Customer A would receive and view the personalized birthday message from Customer B. In one embodiment, the message may wish Customer B a happy birthday month.

The content of the message may include a simple message relating to a personal event, such as "Happy Birthday!" The message may be a standard message populated by the ATM messaging logic 185 or the message may be customized. The message may also be conveyed in any language understood by the responder, for example, Spanish, Mandarin, French, English, etc. In one embodiment, the ATM 150 may dynamically populate the joint account holder's name on the screen/display 170 and a message may be populated based on the joint account holder's name and the event-related data retrieved by the ATM messaging logic 185. In another embodiment, the message may include a voice message, vocal recording, musical jingle (e.g., the happy birthday tune/song), a short video, a meme, an animated graphical interchange format (gif) content, etc. The user 140 may create or customize the message in a variety of ways. The example the user 140 may enter personalized messages. The user 140 may sketch messages and or pictures using a touch screen for example. The user 140 may create and select a background color, theme, wallpaper, etc. The user 140 may also make a selection from preloaded standard messages available through the ATM 150. In some embodiments, the user 140 may upload one or more photos for display in the background of the message.

In some embodiments, the user 140 may be permitted to attach a gift to the message for the recipient. The gift may comprise a variety of forms, including but not limited to cash, demand deposit account deposit, currency towards student loans, money for a particular trip (e.g., vacation), a credit card payment, a home payment, rent payment, a car payment, a transfer of rewards points, etc. The user 140 may be permitted to designate a restricted gift (e.g., only money towards student loans), designate a gift with limited options selectable by the recipient (e.g., $300 car payment or $300 rent payment), or designate an unrestricted gift in which the recipient may choose the form of the gift. According to some embodiments, the user may have the option to select the channel(s) through which the recipient receives the message or the gift. For example, the user may make a selection to provide the message or gift to the recipient through an ATM 150, a mobile application, a website (e.g., a financial institution's website), etc.

The process 300 may include sending the message to the recipient (370). The ATM messaging logic 185 may be configured to send the message to the recipient. In another embodiment, the ATM messaging logic 185 is configured to send the message to the event messaging logic 120, which then sends the message to the recipient. In yet another embodiment, the user 140 may designate when the user 140 would like the message delivered (e.g, during the month of the date, a particular number of days prior to the date, etc.). In another embodiment, the system 100 may be configured to propose a delivery date to the user 140, and the user 140 can accept or deny the proposed delivery date. Again, the messaging service may integrate multiple platforms during the implementation of generating and sending the messages. Hence, while an ATM is given as an example in FIG. 3, the recipient may also receive the message through an a financial institution website, an application on a mobile device, through in-store banking, etc.

Figure 4:
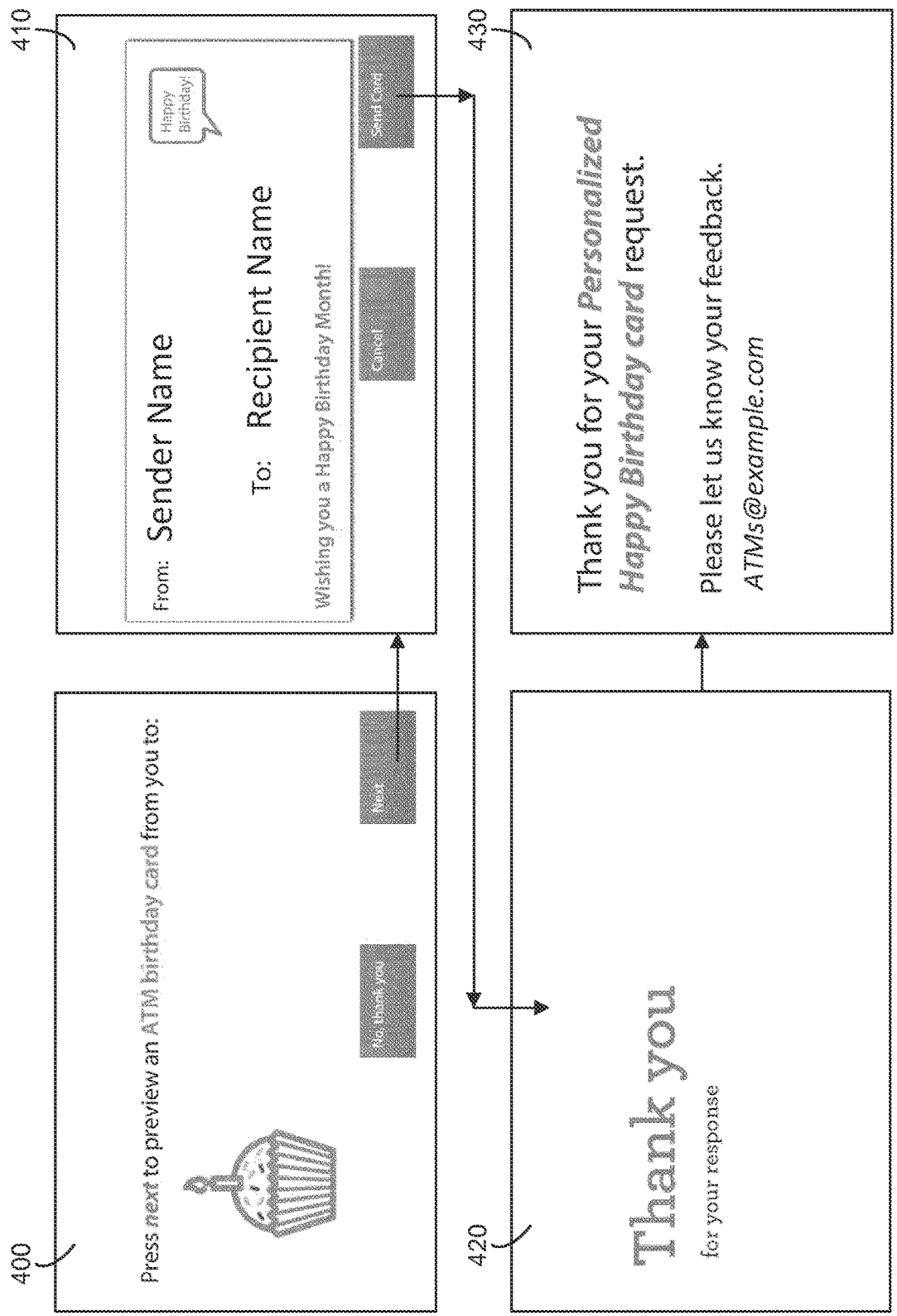
FIG. 4 is a schematic screen flow diagram of a process for of sending another account holder a happy birthday message through an ATM, according to an example embodiment.

FIG. 4 is a schematic screen flow diagram of a process for a sender to send another account holder a happy birthday message through an ATM, according to an example embodiment. Screen 400 prompts a user 140 to send an ATM 150 birthday card (e.g., a message as described throughout) to a recipient (e.g., the other account holder). In this example, it is assumed that the user has not already provided a menu-based input indicating an interest in configuring a personal message for another account holder, but rather is spontaneously prompted to do so by the ATM 150. In some embodiments, the computing system of the ATM 150 may be configured to dynamically populate the electronic card with the other account holder's name displayed in the recipient name field. The user 140 may decline the invitation to send a card by selecting the "No, thank you" field shown in screen 400, which may then transfer the screen flow to a terminal screen 420 thanking the user 140 for the response. The user 140 may decide to proceed with creating the card and select "next" on screen 400. The screen flow may proceed to screen 410, which allows the user 140 to preview the birthday card. The birthday card may contain the sender name (e.g., the name of the user 140), the recipient's name, and a birthday message (e.g., "Wishing you a Happy Birthday Month!"). In some embodiments, the electronic birthday card may contain a graphic as displayed by the speaking cloud with the message "Happy Birthday" written within.

Upon previewing the card, the user 140 may decide not to proceed with sending the card. In such case, the user 140 may select cancel and the screen flow may proceed to the terminal screen 420 that thanks the user 140 for the response. At screen 410, the user 140 may decide to proceed with sending the card as previewed by selecting "send card" as shown in FIG. 4. The screen flow may proceed to a confirmation screen 430 that thanks the user 140 for the personalized happy birthday card request. The confirmation screen 430 may also invite the user 140 to give feedback to the financial institution regarding the process of generating the card.

Figure 5:
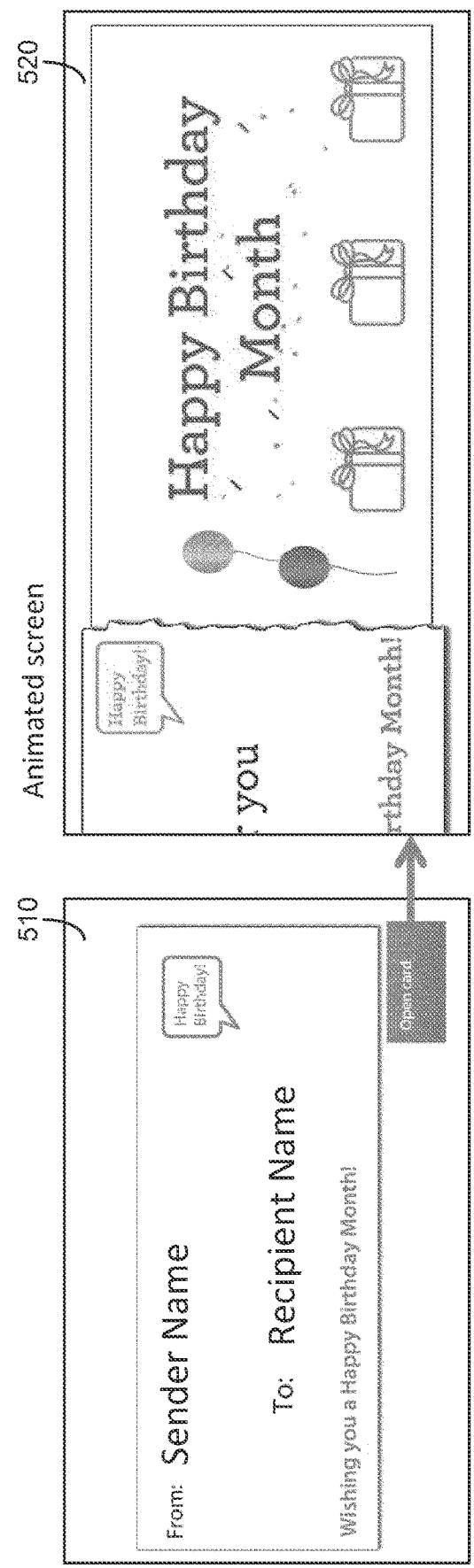
FIG. 5 is a schematic screen flow diagram of a process for receiving and viewing the happy birthday message generated in FIG. 4, according to an example embodiment.

FIG. 5 is a schematic screen flow diagram of a process for a recipient to view the happy birthday message generated in FIG. 4, according to an example embodiment. At screen 510, the recipient may view a first screen of the card of FIG. 4, which may display the sender's name, the recipient's name, and a message. The recipient may engage a field that allows the recipient to open the card. Upon engaging the field, the recipient may be transferred to animated screen 520, which may show an animation of characters and graphics relaying the Happy Birthday message.

Figure 6:
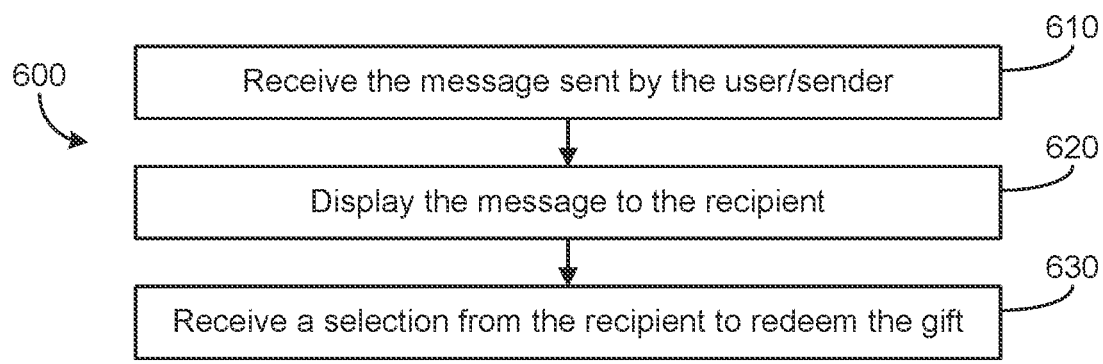
FIG. 6 is a flow diagram of a process for redeeming a gift attached to a message, according to an example embodiment.

FIG. 6 is a flow diagram of a process for redeeming a gift attached to a message, according to an example embodiment. The recipient may receive the message sent by the user 140 (610). The message may be received through the ATM 150 or any other platform configured to allow the user 140 to generate the message (e.g., a mobile application). In some embodiments, the ATM messaging logic 185 determines that date is within a notification period set by the user 140 and/or the ATM messaging logic 18 (e.g., the month of the date) and then triggers the transfer of the message.

The process may involve displaying the message to the receiver (620). The message can be displayed to the recipient once the recipient accesses the bank computing system 105 to carry out banking activities such as cash withdrawal, checking balances, depositing funds, etc. The message may be displayed to the recipient via a variety of platforms used the by recipient to facilitate the banking activities described throughout, including an ATM, mobile device using the financial institution website or mobile application, etc. Once the recipient views the message, the recipient may redeem a gift if one is attached to the message. If the user 140 designated a restricted gift, then the recipient may redeem the gift according to the form chosen by the recipient. Otherwise, the recipient may enter a selection of a gift according to the form in which the recipient wishes to redeem the gift, for example, by a cash deposit into a checking or savings account, payment of a past due credit card bill, transfer of rewards points, etc. The process may receive the selection from the recipient to redeem the gift (630). The selection may be received through a touch screen display or through any interface mechanism available to the recipient (e.g., ATM, smartphone, tablet, laptop, etc.). Upon receiving the selection, the bank computing system 105 may carry out the transaction to redeem the gift for the recipient.

The embodiments of the methods and system have been described with reference to drawings. The drawings illustrate certain details of specific embodiments that implement the systems and methods and programs of the present disclosure. However, describing the disclosure with drawings should not be construed as imposing on the disclosure any limitations that may be present in the drawings. The embodiments described above contemplate methods, systems and program products stored on any non-transitory machine-readable storage media for accomplishing its operations. The embodiments may be implemented using an existing computer processor, or by a special purpose computer processor incorporated for this or another purpose or by a hardwired system.

As noted above, embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosure is not limited to a particular embodiment, but extends to various modifications, combinations, and permutations that nevertheless fall within the scope and spirit of the appended claims.

What is claimed is:

1. A system comprising:
    a computing system associated with a financial institution and communicatively coupled with one or more automated teller machines (ATMs), the computing system configured to:
        authenticate an account holder via an ATM of the one or more ATMs based on identification information of the account holder;
        identify an event associated with the account holder;
        determine a message relating to the event to be displayed to the account holder based on the event; and
        display the message to the account holder via the ATM, the message being displayed based on the account holder accessing the ATM within a threshold time period associated with the event.

2. The system of claim 1, wherein the computing system is configured to receive the identification information of the account holder via the ATM.

3. The system of claim 1, wherein the threshold time period is a time window based on a date associated with the event.

4. The system of claim 3, wherein the computing system is configured to store trigger configuration information comprising the time window, and display the message to the account holder based on the trigger configuration information.

5. The system of claim 4, wherein the account holder is a first account holder, and the computing system is configured to receive an input from a second account holder regarding the trigger configuration information.

6. The system of claim 1, wherein the account holder is a first account holder, and the computing system is configured to receive an input from a second account holder to determine the message to be displayed to the first account holder.

7. The system of claim 1, wherein the message comprises a countdown to the event based on the event being an upcoming event.

8. A system comprising:
    a computing system associated with a financial institution and communicatively coupled with one or more automated teller machines (ATMs), the computing system configured to:
        identify an event associated with an account holder; and
        display a message regarding the event to the account holder via an ATM of the one or more ATMs based on the account holder being authenticated at the ATM, the message being displayed based on the account holder accessing the ATM within a threshold time period associated with the event.

9. The system of claim 8, wherein the computing system is configured to authenticate the account holder based on identification information of the account holder received via the ATM.

10. The system of claim 8, wherein the threshold time period is a time window based on a date associated with the event.

11. The system of claim 10, wherein the computing system is configured to store trigger configuration information comprising the time window, and display the message to the account holder based on the trigger configuration information.

12. The system of claim 11, wherein the account holder is a first account holder, and the computing system is configured to receive an input from a second account holder regarding the trigger configuration information.

13. The system of claim 8, wherein the account holder is a first account holder, and the computing system is configured to receive an input from a second account holder to determine the message to be displayed to the first account holder.

14. The system of claim 8, wherein the message comprises a countdown to the event based on the event being an upcoming event.

15. A system comprising:
- a computing system associated with a financial institution and communicatively coupled with one or more automated teller machines (ATMs), the computing system configured to:
  - identify an event associated with an account holder; and
  - display a message regarding the event to the account holder via an ATM of the one or more ATMs based on the account holder being authenticated at the ATM.

16. The system of claim 15, wherein the computing system is configured to authenticate the account holder based on identification information of the account holder received via the ATM.

17. The system of claim 15, wherein the computing system is configured to display the message during a time window based on a date associated with the event.

18. The system of claim 17, wherein the computing system is configured to store trigger configuration information comprising the time window, and display the message to the account holder based on the trigger configuration information.

19. The system of claim 18, wherein the account holder is a first account holder, and the computing system is configured to receive an input from a second account holder regarding the trigger configuration information.

20. The system of claim 15, wherein the account holder is a first account holder, and the computing system is configured to receive an input from a second account holder to determine the message to be displayed to the first account holder.

* * * * *